US000001411H

United States Statutory Invention Registration [19]

[11] Reg. Number: H1411

Deshmukh

[43] Published: Feb. 7, 1995

[54] MAGNESIUM-LITHIUM ALLOYS HAVING IMPROVED CHARACTERISTICS

[76] Inventor: Uday V. Deshmukh, 92-F Elder Dr., Pacheco, Calif. 94553

[21] Appl. No.: 975,370

[22] Filed: Nov. 12, 1992

[51] Int. Cl.[6] ..... C22C 23/00

[52] U.S. Cl. ..... 75/249; 419/32; 419/41; 420/402; 420/407; 420/411; 420/414

[58] Field of Search ..... 75/249; 419/32, 41; 420/402, 407, 411, 414

[56] References Cited

U.S. PATENT DOCUMENTS

| | | | |
|---|---|---|---|
| 4,597,792 | 7/1986 | Webster | 75/249 |
| 4,624,705 | 11/1986 | Jatkar et al. | 75/239 |
| 4,722,751 | 2/1988 | Akechi et al. | 75/232 |
| 4,758,273 | 7/1988 | Gilman et al. | 758/249 |
| 4,834,941 | 5/1989 | Shiina | 420/532 |

OTHER PUBLICATIONS

R. J. Jackson et al., "Properties and Current applications of Magnesium–Lithium Alloys", Battelle Memorial Institute, 1967.

Gonzalez–Doncel, et al., "The Use of Foil Metallurgy Processing to Achieve Ultrafine Grained Mg–9Li Laminates and Mg–9Li–5$B_4C$ Particulate Composites", J. Mater Sci., 25 (1990) 4535–40.

J. S. Benjamin, "Mechanical Alloying", Scientific American, vol. 234, No. 5, 1976, pp. 40–48.

J. C. Webster, "Lightweight Magnesium–Lithium Alloy", Light Metals, Jan. 1964, pp. 46–47.

*Primary Examiner*—Ngoclan T. Mai

[57] ABSTRACT

Magnesium lithium based alloys prepared by mechanical alloying are disclosed.

8 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MAGNESIUM-LITHIUM ALLOYS HAVING IMPROVED CHARACTERISTICS

BACKGROUND OF THE INVENTION

The present application is related to magnesium-lithium based alloys and methods of their preparation.

Magnesium-lithium based alloys have been recognized as having potential in aerospace applications since the early 1960's. These alloys have low density along with mechanical properties, weldability and physical properties which make them interesting for use in aircraft and aerospace applications.

Traditionally, magnesium-lithium alloys have been melted and cast by conventional methods. A problem with producing magnesium-lithium alloys in this way is that lithium and, to a lesser extent, magnesium react readily with oxygen and nitrogen in the temperature range of about 650° C. to 750° C. which is required for melting. In addition, the ductility of these alloys is quite sensitive to low levels of sodium impurities requiring use of high purity lithium.

One approach to protecting the molten alloys from contact with oxygen and nitrogen and the related danger of burning is to use a flux cover on the exposed surface of the melt. A second method uses an inert gas cover to protect the molten metal. A third method that has been considered is melting under vacuum. None of these methods are without problems.

Magnesium-lithium based alloys made by conventional routes have severe strength limitations. Alloys have been made containing such elements as silver, aluminum, cadmium or zinc which have high strength, but the precipitate that imparts high strength is unstable and ages excessively even at room temperature resulting in significant loss of strength. Additionally, alloys made this way are sensitive to stress corrosion cracking. Alloys which are stable at room temperature have low strength. Furthermore, these alloys all have low creep strength.

Additionally, since magnesium-lithium alloys were first seriously considered for use in aerospace and other applications, the demands on such materials have changed and there exists a need for alloys having improved properties of yield strength (under compression or tension), ultimate tensile strength, creep strength and thermal stability.

Thus, there is a need for magnesium-lithium alloys having improved characteristics that are prepared by methods which avoid the dangers associated with traditional ingot metallurgy.

SUMMARY OF THE INVENTION

The present invention is a magnesium based alloy containing lithium and, optionally, aluminum, zinc, zirconium, titanium, calcium, tin, silver, yttrium, cerium, neodymium or mixtures thereof which is prepared by mechanical alloying and has mechanical properties and thermal stability characteristics which are improved over characteristics of identical alloys prepared by other methods such as ingot metallurgy.

Such alloys are useful in, for example, aerospace applications.

DETAILED DESCRIPTION OF THE ILLUSTRATIVE EMBODIMENTS

The magnesium-lithium based alloys of the present invention preferably correspond to the formula:

$$Mg_wLi_xM_yI_z$$

wherein M is an element selected from the group consisting of aluminum, zinc, zirconium, titanium, calcium, silver, tin or mixtures thereof; I represents impurities; w represents the weight percent of Mg in the alloy; x represents the weight percent of Li in the alloy; y represents the weight percent of M in the alloy; z represents the weight percent of impurities in the alloy; $w+x+y+z=100$; the value of w is at least about 50 and no greater than about 88; the value of x is at least about one and no greater than about 50; the value of y is from zero to about 10; and the value of z is from zero to about 5.

In a preferred embodiment, the value of w is at least about 65 and no greater than about 88; the value of x is at least about 12 and no greater than about 20; the value of y is at least about 1 and no greater than about 15; and the value of z is no greater than about 2. When M is present, it is preferably selected from the group consisting of aluminum, zinc, calcium and silver. It is preferred that M is present. It is more preferred that x is from 13 to 15, most preferably about 14.

Alloys prepared by the process of the present invention include those containing at least 14 weight percent lithium; up to 10 weight percent aluminum, zinc, calcium, tin, yttrium, silver, titanium, zirconium, cerium and/or neodymium, with the balance being magnesium.

The mechanically alloyed magnesium-lithium based alloys of the present invention have improved properties of tensile yield strength, ultimate tensile strength, compressive yield strength, hardness and thermal stability when compared to alloys prepared by conventional ingot technology.

The alloys of the present invention are prepared by mechanical alloying. Mechanical alloying as a method of preparing alloys is in general well known. For example, U.S. Pat. Nos. 4,624,705 and 4,758,273 each discuss methods of preparing aluminum alloys. Generally, mechanical alloying means a process wherein powder ingredients are subjected to impacts by an impacting medium so as to cause a multiplicity of particle weldings and fracturing until the powder ingredients are converted to an essentially uniform powder product. Attritors and horizontal ball mills are examples of means often used for mechanical alloying.

Processing aids such as lithium stearate, zinc stearate, stearic acid, graphite and decanoic acid are preferably used in the process of the present invention in an amount effective to prevent or lessen the welding of the powders to the grinding media or apparatus.

The mechanical alloying of the present invention is done under a protective atmosphere such as argon or other inert gas or under vacuum. The purpose of the protective atmosphere is to avoid oxidation of the materials being alloyed. Safety considerations also make it desirable to avoid oxygen, nitrogen and other gases with which the metal powders being alloyed could react explosively.

Other conditions that are important in the mechanical alloying process of the present invention include operating as close to ambient temperature as possible.

The following examples are provided to illustrate the invention and should not be interpreted as limiting it in any way. Unless stated otherwise, all parts and percentages are by weight.

In the following examples, the mechanically alloyed alloys were prepared using the following steps:

(a) commercially available elemental powders of magnesium, lithium and other metals were used;

(b) a processing additive was added to the starting materials in a given amount;

(c) the starting materials were added to an appropriate vial under an inert atmosphere;

(d) the vial was placed in a shaker mill and shaken for a specified time.

The alloying was conducted at ambient temperature and pressure.

EXAMPLE 1

Using the above procedure wherein from 1–2 weight percent stearic acid and lithium stearate were used as processing additives, the following alloys were prepared:

| | |
|---|---|
| (a) $Mg_{80.5}Li_{14}Al_1Zn_4Zr_{0.5}$ | (b) $Mg_{80}Li_{14}Al_1Zn_4Zr_1$ |
| (c) $Mg_{79.5}Li_{14}Al_2Zn_4Zr_{0.5}$ | (d) $Mg_{79}Li_{14}Al_2Zn_4Zr_1$ |
| (e) $Mg_{78.5}Li_{14}Al_3Zn_4Zr_{0.5}$ | (f) $Mg_{78}Li_{14}Al_3Zn_4Zr_1$ |
| (g) $Mg_{86}Li_{14}$ | (h) $Mg_{84}Li_{16}$ |
| (i) $Mg_{82}Li_{14}Al_1Zr_3$ | (j) $Mg_{82}Li_{14}Al_1Ti_3$ |
| (k) $Mg_{70}Li_{30}$ | (l) $Mg_{80}Li_{20}$ |
| (m) $Mg_{78}Li_{22}$ | (n) $Mg_{65}Li_{20}Al_{15}$ |
| (o) $Mg_{75}Li_{15}Al_5Zn_5$ | (p) $Mg_{65}Li_{15}Al_{10}Zn_{10}$ |
| (q) $M_{76}Li_{14}Al_{10}$ | (r) $Mg_{79}Li_{14}Al_7$ |
| (s) $Mg_{81}Li_{14}Al_5$ | (t) $Mg_{77}Li_{20}Al_3$ |
| (u) $Mg_{93}Li_7$ | (v) $Mg_{91}Li_9$ |
| (w) $Mg_{77}Li_{19}Al_4$ | (x) $Mg_{78}Li_{16}Al_6$ |
| (y) $Mg_{81}Li_{14}Ag_5$ | (z) $Mg_{76}Li_{14}Ag_{10}$ |
| (aa) $Mg_{81}Li_{14}Ti_5$ | (bb) $Mg_{76}Li_{14}Ti_{10}$ |
| (cc) $Mg_{81}Li_{14}Zr_5$ | (dd) $Mg_{76}Li_{14}Zr_{10}$ |
| (ee) $Mg_{79}Li_{14}Al_7$ | (ff) $Mg_{76}Li_{14}Al_{10}$ |

EXAMPLE 2

Using the method set forth above, the alloys listed in Table I were prepared using 1 weight percent stearic acid as a processing additive and 16 hours as shaking time. The powder was removed from vials and cold compacted at 50,000 pounds force. The compact was heated to 300° C. and extruded. The extrusion ratio (ratio of cross sectional area of compact divided by the cross-sectional area of the extruded rod) was 16:1. The rod diameter was 5/16 inches. The rods were then tested to determine their properties.

Tensile tests were done according to the ASTM method B557-84 on standard samples with a ⅛ inch diameter and a length of 0.5 inch. A dynamic extensometer was used to measure strain to obtain the elastic modulus and 0.2 percent offset yield strength. Compression tests were done on right circular cylinders according to ASTM method E9-89. The sample diameter was 0.225 inch and the length was 0.7875 inch. Again, a dynamic extensometer was used to measure strain to obtain the elastic modulus and 0.2 percent offset yield strength. Hardness numbers were measured using a Tukon microhardness tester using a load of 100 g. The density of the extruded alloys was measured using a helium pycnometer. The results obtained are given in Table I below.

TABLE I

| ALLOY | DEN. ($g/cm^3$) | UTS (ksi) | TYS (ksi) | CYS (ksi) | % E |
|---|---|---|---|---|---|
| $Mg_{86}Li_{14}$ | 1.4446 | 28.97 | 28.077 | 33.166 | 7.3 |
| $Mg_{85}Li_{14}Al_1$ ① | 1.4577 | 32.84 | 31.144 | 34.322 | 13.9 |
| $Mg_{85}Li_{14}Al_1$ ② | 1.3784 | 17.7 | 13.309 | 13.517 | 54.0 |
| $Mg_{83}Li_{14}Al_3$ | 1.4490 | 34.03 | 31.161 | 37.595 | 9.0 |
| $Mg_{81}Li_{14}Al_5$ | 1.4844 | 38.57 | 36.821 | 41.068 | 7.0 |
| $Mg_{78}Li_{16}Al_6$ | 1.4174 | 35.96 | 32.732 | 39.061 | 7.6 |
| $Mg_{85}Li_{14}Zn_1$ | 1.4634 | 28.81 | 27.822 | 33.788 | 12.7 |
| $Mg_{83.5}Li_{14}Zn_{2.5}$ | 1.4670 | 28.31 | 27.486 | 35.975 | 14.6 |
| $Mg_{80}Li_{14}Zn_5$ | 1.4957 | 31.87 | 29.922 | 36.113 | 9.0 |
| $Mg_{76}Li_{14}Zn_{10}$ | 1.5371 | 29.41 | 27.702 | 36.898 | 9.0 |
| $Mg_{80.5}Li_{14}Al_3Zn_{2.5}$ | 1.4787 | 31.84 | 30.339 | 38.479 | 4.4 |
| $Mg_{85}Li_{14}Sn_1$ | 1.4637 | 29.5 | 27.416 | 31.654 | 8.4 |
| $Mg_{81}Li_{14}Ca_5$ | 1.4652 | 33.95 | 31.199 | 35.969 | 9.1 |
| $Mg_{81}Li_{14}Y_5$ | 1.4944 | 26.5 | 25.5 | 31.392 | 7.0 |
| $Mg_{76}Li_{14}Y_{10}$ | 1.5100 | 28.98 | 27.876 | 30 | 7.0 |
| $Mg_{81}Li_{14}Nd_5$ | 1.4870 | 28.22 | 27.784 | 28.22 | 3.0 |
| $Mg_{76}Li_{14}Nd_{10}$ | 1.5165 | NA | NA | 30 | NA |
| $Mg_{76}Li_{14}Ce_{10}$ | 1.5405 | 26.28 | 25.182 | 28.784 | 4.7 |
| $Mg_{79}Li_{14}Al_7$ | 1.4776 | 38.45 | 36.31 | 43.52 | 3.5 |
| $Mg_{76}Li_{14}Al_{10}$ | 1.4991 | 38.68 | 37.81 | 53.1 | 1 |
| $Mg_{81}Li_{14}Ag_5$ | 1.4857 | 35.13 | 33.81 | 37.95 | 12 |
| $Mg_{76}Li_{14}Ag_{10}$ | 1.5371 | 36.85 | 35.42 | 40.32 | 3.52 |
| $Mg_{81}Li_{14}Ti_5$ | 1.4810 | 26.22 | 25.4 | 28.53 | 7 |
| $Mg_{76}Li_{14}Ti_{10}$ | 1.5065 | 26.32 | 25.5 | 28.48 | 4 |
| $Mg_{81}Li_{14}Zr_5$ | 1.4796 | 26.76 | 25.8 | 28.62 | 14 |
| $Mg_{76}Li_{14}Zr_{10}$ | 1.5158 | 25.97 | 24.87 | 28.7 | 14 |

UTS: Ultimate Tensile Strength
TYS: Tensile Yield Strength
CYS: Compressive Yield Strength
% E: % Elongation
①Value presented is average of 10 alloys.
②Not an embodiment of the invention. Alloy prepared by ignot metallurgy.

The data in Table I clearly shows the improved characteristics obtained when a magnesium-lithium based alloy is prepared by mechanical alloying rather than by conventional techniques such as ingot metallurgy.

What is claimed is:

1. A magnesium lithium alloy corresponding to the formula $$Mg_wLi_xM_yI_z$$

wherein M is an element selected from the group consisting of aluminum, zinc, calcium, tin, yttrium, silver, titanium, zirconium, cerium and neodymium and mixtures thereof; I represents impurities; w represents the weight percent of Mg in the alloy; x represents the weight percent of Li in the alloy; y represents the weight percent of M in the alloy; z represents the weight percent of impurities in the alloy; $w+x+y+z=100$; the value of w is at least about 50 and no greater than about 88; the value of x is at least about one and no greater than about 50; the value of y is from zero to about 10; and the value of z is from zero to about 5, prepared by mechanical alloying.

2. The alloy of claim 1 wherein w is from 65 to 88; x is from 12 to 20; y is from 1 to 15 and z is no greater than 2.

3. The alloy of claim 1 wherein x is from 13 to 15.

4. The alloy of claim 3 wherein M is aluminum, zinc, calcium or silver.

5. The alloy of claim 4 wherein M is aluminum and y is from 1 to 10.

6. The alloy of claim 4 wherein M is zinc and y is from 1 to 5.

7. The alloy of claim 4 wherein M is calcium and y is from 1 to 5.

8. The alloy of claim 4 wherein M is silver and y is from 1 to 5.

* * * * *